United States Patent

[11] 3,579,273

[72] Inventor Harold D. Cook
Wheaton, Ill.
[21] Appl. No. 764,247
[22] Filed Oct. 1, 1968
[45] Patented May 18, 1971
[73] Assignee Teletype Corporation
Skokie, Ill.

[54] DYNAMIC SHIFT REGISTER
6 Claims, 4 Drawing Figs.

[52] U.S. Cl. .......... 307/221, 307/246, 307/251, 328/37
[51] Int. Cl. .......... G11c 19/00
[50] Field of Search .......... 307/221, 251, 279, 304, 205, 246; 328/37

[56] References Cited

UNITED STATES PATENTS

| | | | |
|---|---|---|---|
| 3,393,325 | 7/1968 | Borror et al. | 307/205 |
| 3,395,292 | 7/1968 | Bogert | 307/221 |
| 3,406,346 | 10/1968 | Wanlass | 307/304X |

OTHER REFERENCES

General Instrument Corporation, Application Notes, titled MTOS SHIFT REGISTERS written by Arthur Sidorsky, Dec. 1967, page 3 relied on 307/221.

An article titled MULTIPHASE CLOCKING ACHIEVES 100-Nsec MOS MEMORY, written by L. Boysel & J. Murphy, in EDN June 10, 1968, pp. 50— 52 & 54, 55. 307/304.

*Primary Examiner*—Stanley T. Krawczewicz
*Attorneys*—J. L. Landis and R. P. Miller

ABSTRACT: A dynamic integrated circuit MOS shift register includes a first storage capacitor which is charged by a first clock signal to a predetermined voltage. This first capacitor then is discharged or remains charged corresponding to an input signal applied to a shunting MOS insulated-gate field-effect transistor connected in series with a control MOS insulated-gate field-effect transistor having a second clock signal applied to it. The control transistor is rendered conductive by the clock signal and the shunting transistor is rendered conductive by an input signal of one type and remains nonconductive for an input signal of a second type. Thus, the capacitor is discharged only when an input signal of said one type occurs. Following the application of the input signal, a transfer MOS insulated-gate field-effect transistor is rendered conductive by the application of a third clock pulse to transfer the charge on the storage capacitor to the distributed gate-to-substrate capacitance present at the gate of the shunting transistor for the next stage. The charge on the distributed capacitance then constitutes the input for the next stage of the shift register and the cycle is repeated.

INVENTOR
HAROLD D. COOK
BY La Valle Stah
ATTORNEY

DYNAMIC SHIFT REGISTER

BACKGROUND OF THE INVENTION

In data handling and data communications systems it is desirable to provide for electrical pulse handling circuits, such as shift registers in many applications. Shift registers are used extensively in digital communications systems to delay voltage pulses, to store digital information, to count voltage pulses and to convert serial digital information to parallel digital information and vice versa.

In metal-oxide semiconductor (MOS) technology, using insulated-gate field-effect transistors, there has been developed a large number of dynamic shift register configurations taking advantage of the inherent gate-to-substrate capacitance of an MOS transistor as a temporary storage element in the shift register. Most of these dynamic MOS shift registers use six transistors per stage and operate with a four-phase clock or a two-phase clock having each of the two clock pulses delayed to form what amount to be third and fourth phases of clock signals for each stage of the register. The shift pulses which are applied to the register must be applied at a repetition rate which is greater than the RC time constant of the distributed gate capacitance in order to restore the charge level of the capacitor from stage-to-stage to accomplish the shifting of information through the register. Thus, there exists a very definite lower frequency limit to the operation of such registers.

SUMMARY OF THE INVENTION

Each stage of a dynamic shift register includes a first storage device which is charged to a predetermined level by a first clock signal. The storage device then is discharged or remains charged by the operation of a shunting device, the conduction of which is controlled in accordance with an input signal. Following the application of the input signal, a second transfer device is rendered conductive to transfer the charge from the first storage device to a second storage device forming the input to the next stage of the register.

DETAILED DESCRIPTION

Figure 1:
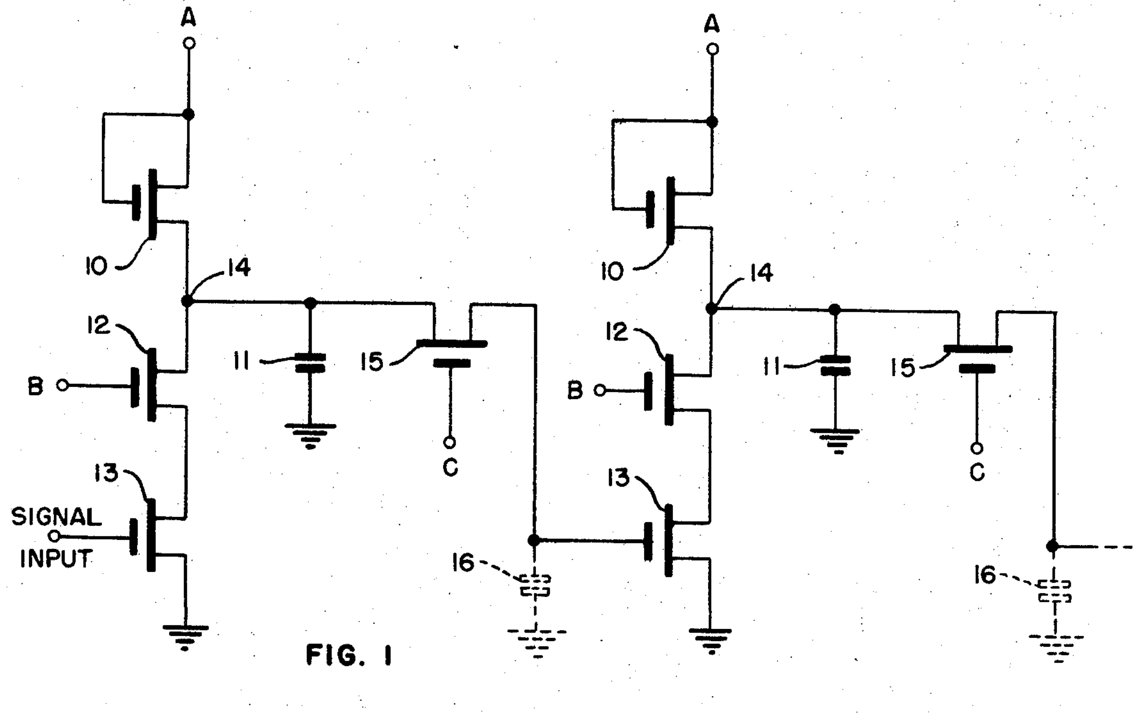
FIG. 1 is a detailed circuit diagram of a first embodiment of the invention.
Figure 3:
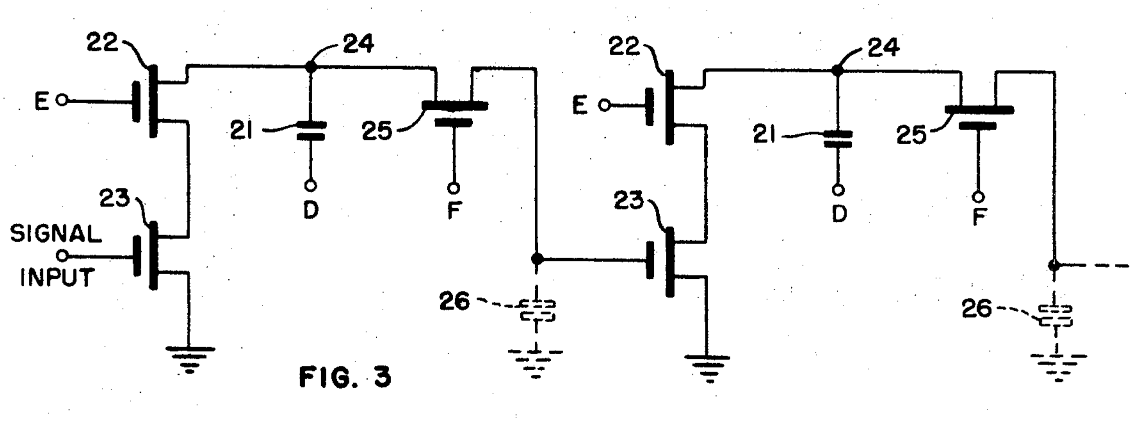
FIG. 3 shows a detailed circuit diagram of a second embodiment of the invention.

In FIGS. 1 and 3 of the drawing, there are shown two embodiments of a dynamic shift register made in accordance with this invention, and both of the illustrated embodiments are shown as applied to MOS integrated circuits using P-channel enhancement mode devices. Although the ensuing description is limited to P-type enhancement mode type devices, it should be understood that the principles of the invention apply equally well to circuits using P-channel depletion mode devices or N-channel enhancement or depletion mode devices.

Referring now to FIG. 1, there is shown a multistage shift register using MOS insulated-gate field-effect transistors (MOSFET) as the primary elements of each stage of the shift register. Each of the stages of the shift register are identical and operate in the same manner, so that the same reference numerals are used for similar elements in each of the stages.

To initiate operation of the shift register circuits shown in FIG. 1, a first transistor 10, connected in the circuit as a load resistor by connecting its gate to its drain, is rendered conductive by the application of a negative potential (waveform A, FIG. 2) at an input terminal A. A first discrete storage capacitor 11 then charges to this negative potential from ground through a common terminal 14 interconnecting one terminal of the capacitor 11 and the source of the transistor 10.

Following the charging of the capacitor 11, the potential on the input terminal A rises to a ground potential, causing the transistor 10 to be rendered nonconductive; so that the capacitor 11 holds the charge which it attained during the time that the transistor 10 was conducting. A pair of additional transistors 12 and 13 are connected in series between ground and the terminal 14 to provide a discharge path for the capacitor 11. At a time $t_2$ (see FIG. 2), the potential applied to a terminal B (waveform B) on the gate of the transistor 12 drops from ground potential to a negative potential, rendering the transistor 12 conductive. At the same time, an input signal is applied to the gate of the transistor 13; and if this input signal also is a negative potential, the transistors 12 and 13 both are conductive simultaneously and the capacitor 11 discharges to near ground potential through the source-drain paths of the transistors 12 and 13.

The input signals applied to the gate of the transistor 13, however, are binary signals having either a ground potential or a negative potential; and if a signal having a ground or near ground potential is applied to the gate of the transistor 13, it is not rendered conductive during the time that the transistor 12 is rendered conductive by the pulse on terminal B. As a result, the capacitor 11 cannot discharge due to the fact that both the transistors 10 and 13 are nonconductive, even though transistor 12 is conductive.

At a time $t_3$ (FIG. 2), the negative pulse on the terminal B terminates; and the transistor 12 once again is rendered nonconductive, thereby terminating the input cycle of operation for the shift register. As a consequence, the capacitor 11 is charged or discharged in accordance with the binary signal applied to the signal input terminal connected to the gate of the transistor 13.

Figure 2:
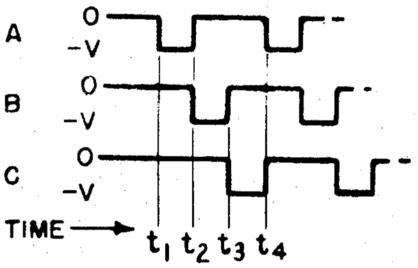
FIG. 2 shows waveforms useful in understanding the operation of the circuit shown in FIG. 1.

As shown in FIG. 2, at a time $t_3$, 3, which follows the termination of the negative pulse on input terminal B, a negative pulse (waveform C) is applied to an input terminal C which normally is at ground or near ground potential. Input terminal C is connected to the gate of a fourth transistor 15, causing that transistor to be rendered conductive between times $t_3$ and $t_4$ as shown in FIG. 2. This causes the capacitor 11 to be connected to a capacitor 16. This capacitor 16 consists of the distributed capacitance in the connections present between the transistors 15 and 13, plus the insulated gate capacitance at the gate of the transistor 13, commonly called the intrinsic gate capacitance. The major portion of the capacitance 16, however, is due to the gate capacitance of the transistor 13.

When the capacitor 11 is connected to the capacitor 16, a portion of the charge present on the capacitor 11 is shifted or transferred to the capacitor 16 where it is momentarily stored as the input signal for the next stage of the register.

At time $t_4$, the transistors 15 in all of the stages then are once again rendered nonconductive; and the entire foregoing operation is repeated, with negative clock pulses being applied to terminals A, B and C in the same sequence described above in detail. The data applied to the signal input terminal then is shifted from left to right through the different stages of the shift register.

It should be noted that if a negative signal input is applied to the input transistor 13 for the first (leftmost) stage of the register, the potential transferred to the capacitor 16 at the input of the next or second stage is near ground potential. When this ground signal then is transferred from the capacitor 16 at the input of the second stage to the output of the second stage, the signal is inverted; and a negative potential is stored on the capacitor 16 at the input of the third stage. Thus, the shifted information is inverted at each stage of the shift register as it moves down the register. This is no problem, however, since this fact is known and can be considered in obtaining the outputs from any given stage or in designing the number of stages in the register to provide an output which is the same as the signal input or is an inverted output.

The RC time constant for discharging the capacitor 16 forms the lower frequency limit for the operation of the portion of the cycle between the termination of the pulse on input terminal C and the application of the next pulses on input terminals A and B. Similarly, the RC time constant for discharging the capacitor 11 is the limiting factor between the termination of the pulse on terminal B and the commencement of the next pulse on terminal C to transfer the information from the capacitor 11 to the capacitor 16. The storage time of the capacitors 11 and 16 is the RC time constant for discharging these capacitors with all of the transistors in the circuit in their "off" or nonconducting states. If low frequency operation is desired, the relative times of occurrence of the input timing pulses may be adjusted to cause a delay to occur between the termination of the pulse on terminal B and the commencement of the pulse on terminal C or by causing a delay to occur between the termination of the pulse on terminal C and the commencement of the pulses next occurring on terminals A and B. It also should be noted that the pulse applied to terminal B need not follow directly the termination of the pulse supplied to terminal A, with the limitation being that the pulse supplied to terminal B to render the transistor 12 conductive must occur within a time interval which is less than the time required for the charge on the capacitor 11 to leak off. Thus, by introducing delays between all of the pulses in the manner indicated above, the maximum low frequency operation of the shift register may be attained. Of course for higher frequency operation, it is not necessary to introduce such delays between the time of occurrence of the various timing pulses applied to terminals A, B and C.

It also should be noted that the pulses on terminals A and B can occur simultaneously, so that only a two-phase clock need be employed instead of the three-phase clock illustrated in the operation of FIG. 1. When pulse B coincides with the pulse on terminal A, the signal input still must occur during the application of the pulse on terminal B. Thus, if the input signal is at or near ground potential so that the transistor 13 does not conduct, the capacitor 11 is charged to a negative potential and remains charged to that potential upon the termination of the pulse on input terminal A. If, however, the input signal applied to the gate of the transistor 13 is a negative signal, the capacitor 11 is prevented from charging to the negative potential due to the fact that the low impedance path provided by the drain-to-source path of the transistors 12 and 13 provides essentially a ground potential on the terminal 14 to prevent such charging of the capacitor 11. As a consequence, when the pulses on the terminals A and B are terminated in this example, the capacitor 11 is charged or discharged in the same manner as in the preceding example utilizing a three-phase clock. The occurrence of the pulse on terminal C still must occur subsequently to the termination of the pulses on terminals A and B to transfer the information from the capacitor 11 to the capacitor 16 at the output of each stage. This gate capacitance in each stage then provides the input signal for the next succeeding stage throughout the register.

Referring now to FIG. 3, there is shown another embodiment of the invention using only three transistors per stage of the shift register instead of the four transistors per stage used in the embodiment shown in FIG. 1. The elements of the register shown in FIG. 3 are comparable to similar elements found in the embodiment of FIG. 1 and a similar numbering sequence has been given to them, that is, the transistors 12 of FIG. 1 find their counterparts in the transistors 22 of FIG. 3, and the capacitors 11 of FIG. 1 find their counterparts in the capacitors 21 of FIG. 3, etc. In the embodiment shown in FIG. 3, the capacitor 21 in each stage is not connected to ground but has its free terminal connected to an input terminal D which is provided with a series of negative pulses as shown in curve D of FIG. 4. The other terminal of the capacitor 21 is connected to a terminal 24 in series with the source-to-drain paths of a pair of transistors 22 and 23, with the source of the transistor 23 being connected to ground.

Figure 4:
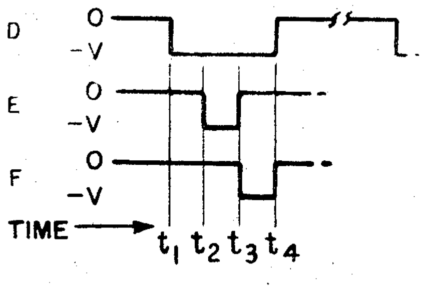
FIG. 4 shows waveforms useful in understanding the operation of the circuit shown in FIG. 3.

At time $t_1$, as shown in FIG. 4, a negative pulse is applied to terminal D of the circuit in FIG. 3, causing a negative-going potential to be AC coupled to the terminal 24 through the capacitor 21. At time $t_2$, a negative pulse is applied to terminal E at the gate of the transistor 22, and during the time that the transistor 22 is rendered conductive, a signal input is applied to the gate of the transistor 23 in each stage. The input signal for the first stage is obtained from any suitable external source and the input signals for the succeeding stages are stored on the gate capacitances 26 at the inputs of those stages of the shift register. If the input signal is negative, the transistor 23 for that stage is rendered conductive, and the terminal 24 is discharged to near ground potential through the conductive transistors 22 and 23.

If, however, the input signal applied to the gate of the transistor 23 is at near ground potential, the negative potential remains on the terminal 24 of the capacitor 21 at the time $t_3$ that the input pulse on the terminal E terminates. The negative potential on terminal 24 of the capacitor 21 remains there for a predetermined period of time determined by the RC characteristics of the circuit through which the charge on the capacitor leaks.

The negative input potential remains present on terminal D, and following the termination of the pulse on terminal E at time $t_3$, a transfer pulse is applied to terminal F connected to the gate of a transfer transistor 25, rendering the transistor 25 conductive and connecting the capacitor 21 in series with the gate capacitance or intrinsic 26 present at the input of the transistor 23 for the next succeeding stage. The charge present on the terminal 24 of the capacitor 21 then is transferred to the capacitor 26, and the bit is shifted one position to the right.

Whenever the signal input is such that the transistor 23 is rendered conductive during the time that the transistor 22 is conductive, the potential on terminal 24 of the capacitor 21 is shunted directly to ground and is at or near ground potential when the pulse on terminal E terminates, causing the transistor 22 to be rendered nonconductive. Because the capacitor 21 is AC coupled, this ground potential remains on the terminal 24 during the time that the transistor 25 is rendered conductive to transfer the information from the capacitor 21 to the capacitor 26.

Thus, whenever the input signal is a negative input signal, rendering the transistor 23 conductive, a ground potential is stored or transferred to the capacitor 26 for the next stage of the shift register; and whenever the signal input is a ground potential, causing the transistor 23 to be rendered nonconductive, a negative potential is transferred from the capacitor 21 to the capacitor 26 when the transfer transistor 25 is rendered conductive by the negative pulse on terminal F.

At time $t_4$ (FIG. 4), the pulses on terminals D and F are terminated, with the potentials applied to both of these terminals rising to ground. It should be noted that the pulse on terminal D cannot be terminated prior to the time that the pulse on terminal F terminates, because the positive-going pulse which is applied to the capacitor 21 would cancel any prior negative potential appearing on the terminal 24 due to the AC coupling. Thus, the negative pulse on terminal D must terminate simultaneously with or after the pulse applied to terminal F terminates to complete the transfer of information from the capacitor 21 to the capacitor 26. Due to the AC coupling of the capacitor 21, when a near ground potential is stored in the capacitor 21 at the time the potential on terminal D returns to ground, there is a tendency for a positive voltage spike to appear on the terminal 24. This voltage spike could be of such magnitude as to forward-bias the transistor 25, causing it to be rendered conductive and thereby destroying the useful information previously transferred to the capacitor 26. In the operation of the circuit, however, this positive spike is clamped to near ground potential by the forward-biased PN junctions existing between the source or drain of the transistors 25 and 22, respectively, and the substrates thereof; so that the transistor 25 is not forward-biased by this voltage spike.

It should be noted, as in the discussion of the operation of the circuit shown in FIG. 1, that the negative pulse on terminal E could coincide with the first portion of the negative pulse on terminal D; and provided that the signal input occurs during the time that the negative pulse on terminal E is present, the circuit will operate in the same manner as described above for a delayed pulse applied to the input terminal E. At time $t_3$, when the negative pulse on the terminal F then would be terminated, the system is prepared for the next cycle of operation, whereupon a negative pulse may be applied to the terminals D and E to cause the sequence of operation described above to be repeated.

From the foregoing, it can be seen that the operation of the circuit of FIG. 3 is similar to the operation of the circuit of FIG. 1, but that no load resistor in the form of a transistor 10 is required in order to charge the capacitors 21 at the beginning of each cycle of operation. Although this invention has been described in conjunction with an insulated gate MOS-FET circuit, it should be understood that the principles of the invention also could be applied to circuits using discrete components.

Although two particular embodiments of the invention have been shown in the drawing and described in the foregoing specification, it is to be understood that other modifications of the invention varied to fit particular operating conditions will be apparent to those skilled in the art, and that the invention is not to be considered limited to the embodiment chosen for purposes of disclosure, but it covers all changes and modifications which do not constitute departures from the true scope of the invention.

I claim:

1. A multistage integrated circuit MOS-FET shift register for sequentially advancing a representation of a binary signal applied at the input of the register through successive stages of the register, which comprises:

a discrete capacitor operating as a temporary storage device in each stage of the shift register;

means for charging the discrete capacitor to a first potential in response to a first clock signal;

first and second series connected field-effect transistors in each stage of the register, each having a gate electrode and connected in series with the capacitor to provide a discharge path for the capacitor, at least the second transistor having an intrinsic gate capacitance;

means for applying a second clock signal on the gate electrode of the first transistor in each stage of the register for a predetermined duration to provide for the conduction thereof, the second clock signal being applied after the first clock signal has terminated;

means for applying the binary input signal to the gate electrode of the second transistor in each stage of the register for controlling the conduction thereof, the binary signal being applied simultaneously with the application of the second clock signal to the gate electrode of the first transistor, a binary signal of a first type causing the second transistor to be driven into conduction to provide a discharge path for the capacitor and a binary signal of a second type causing the second transistor to remain nonconductive so that no discharge path is provided for the capacitor;

a third insulated-gate field-effect transistor in each stage of the register, having a gate electrode and connected in series between the capacitor and the gate electrode of the second transistor for the next succeeding stage; and means for applying a third clock signal on the gate electrode of the third transistor for a predetermined duration to provide for the conduction thereof, the third clock signal being applied after both the first and the second clock signals have terminated, so that any charge present on the capacitor will be transferred to the intrinsic capacitance present at the gate of the second transistor in each succeeding stage of the register following the first stage.

2. An information transferring device, which comprises:

a first discrete capacitor operating as a temporary storage device and having first and second plates;

means for applying a first clock signal to the first plate of the capacitor so that a first potential representing a first type of information is AC coupled to the second plate of the capacitor;

first and second series connected insulated-gate field-effect transistors, each having a gate electrode, connected in series with the second plate of the first capacitor to provide a discharge path for the capacitor;

means for applying a second clock signal to the gate electrode of the first transistor to provide for the conduction thereof;

means for applying a binary input signal to the gate electrode of the second transistor for controlling the conduction thereof, the binary signal being applied simultaneously with the application of the second clock signal to the gate electrode of the first transistor, a binary signal of a first type causing the second transistor to be driven into conduction to provide a discharge path for the first capacitor to provide a second type of information on the second plate of the capacitor and a binary signal of a second type causing the second transistor to remain nonconductive so that no discharge path is provided for the capacitor and so that the first type of information remains on the second plate of the capacitor;

a second capacitor operating as a temporary storage device; and means for transferring the information on the second plate of the first capacitor to the second capacitor under the control of a third clock signal.

3. An information transferring device as recited in claim 2, wherein:

the transferring means is a third insulated-gate field-effect transistor having a gate electrode and connected in series between the second plate of the first capacitor and the second capacitor; and the third clock signal is applied to the gate of the third transistor to provide for the conduction thereof.

4. An information transferring device as recited in claim 3, wherein the second capacitor is the intrinsic gate capacitance of a fourth insulated-gate field-effect transistor.

5. An information transferring device as recited in claim 4, wherein:

the second clock signal is applied to the gate electrode of the first transistor after the first clock signal has been applied to the first capacitor and is removed from the gate electrode of the first transistor prior to the time that the first clock signal is removed from the first capacitor; and the third clock signal is applied to the gate electrode of the third transistor simultaneously with or subsequently to the removal of the second clock signal from the gate electrode of the first transistor and is removed from the gate electrode of the third transistor prior to or simultaneously with the removal of the first clock signal from the first capacitor.

6. An information transferring device as recited in claim 4, wherein:

the second clock signal is applied to the gate electrode of the first transistor simultaneously with the application of the first clock signal to the first capacitor and is removed from the gate electrode of the first transistor prior to the removal of the first clock signal from the first capacitor; and the third clock signal is applied to the gate electrode of the third transistor simultaneously with or subsequently to the removal of the second clock signal from the gate electrode of the first transistor and is removed from the gate electrode of the third transistor simultaneously with or prior to the removal of the first clock signal from the first capacitor.